US008132666B2

(12) United States Patent
McAlister et al.

(10) Patent No.: US 8,132,666 B2
(45) Date of Patent: Mar. 13, 2012

(54) ADJUSTABLE CONVEYOR GUIDE

(75) Inventors: Mark McAlister, Clackmannanshire (GB); Timothy Povey, Dunblane (GB); Ian Spence, North Lanarkshire (GB)

(73) Assignee: Zepf Technologies UK Limited, Scotland (GB)

( * ) Notice: Subject to any disclaimer, the term of this patent is extended or adjusted under 35 U.S.C. 154(b) by 218 days.

(21) Appl. No.: 12/707,792

(22) Filed: Feb. 18, 2010

(65) Prior Publication Data
US 2010/0200373 A1 Aug. 12, 2010

Related U.S. Application Data

(63) Continuation-in-part of application No. 11/661,729, filed as application No. PCT/GB2005/003316 on Aug. 25, 2005, now abandoned.

(30) Foreign Application Priority Data

Sep. 1, 2004 (GB) .................................. 0419393.4

(51) Int. Cl.
*B65G 21/20* (2006.01)
(52) U.S. Cl. .................................. 198/836.3; 198/836.1
(58) Field of Classification Search .............. 198/836.1, 198/836.3
See application file for complete search history.

(56) References Cited

U.S. PATENT DOCUMENTS

| 5,211,280 A * | 5/1993 | Houde ......................... 198/836.3 |
| 5,322,160 A | 6/1994 | Markiewicz et al. ...... 198/836.3 |
| 5,492,218 A | 2/1996 | Falkowski .................. 198/836.3 |
| 5,533,826 A | 7/1996 | Cairns ........................... 403/389 |
| 5,682,976 A | 11/1997 | Jorgensen ................... 198/836.3 |
| 5,782,339 A | 7/1998 | Drewitz ....................... 198/836.3 |
| 6,003,662 A | 12/1999 | McCaffrey et al. ........ 198/836.3 |
| 6,050,396 A | 4/2000 | Moore ......................... 198/836.3 |
| 7,520,380 B2 * | 4/2009 | Ranger ........................ 198/861.1 |
| 7,617,926 B2 * | 11/2009 | Jacob et al. ................. 198/836.3 |
| 7,748,523 B2 * | 7/2010 | Robertson ................... 198/836.1 |
| 2003/0116410 A1 | 6/2003 | Ledingham ................ 198/861.1 |
| 2003/0205447 A1 | 11/2003 | Ledingham ................ 198/836.3 |
| 2008/0116042 A1 | 5/2008 | McAlister et al. .......... 198/836.3 |

FOREIGN PATENT DOCUMENTS

| EP | 0953 523 A2 | 4/1998 |
| FR | 2 544 292 | 10/1984 |
| GB | 2417718 | 3/2006 |
| JP | 62012509 | 1/1987 |
| JP | 4041319 | 2/1992 |

OTHER PUBLICATIONS

"Patents Act 1977 Examination Report under Section 18(3)" for Application No. GB0517443,8; UK Intellectual Property Office, Apr. 25, 2007; 3 pages.
Search Report for related Application No. GB1002794.4, date of search May 21, 2010; 3 pages.

* cited by examiner

*Primary Examiner* — Douglas Hess
(74) *Attorney, Agent, or Firm* — Westman, Champlin & Kelly, P.A.

(57) ABSTRACT

This invention relates to conveyor guides comprising conveyor guide rail units, such as those used on automated handling lines where containers of different sizes are processed. One or more guide rails are employed to the sides of the conveyor guide to ensure that articles follow a desired path. This invention provides an adjustable conveyor guide rail unit that comprises a guide member operable to be set in a plurality of discrete positions, thereby allowing the width of a channel through which an article may be conveyed to be varied. The guide rails are adjustable to accommodate containers of differing sizes.

22 Claims, 12 Drawing Sheets

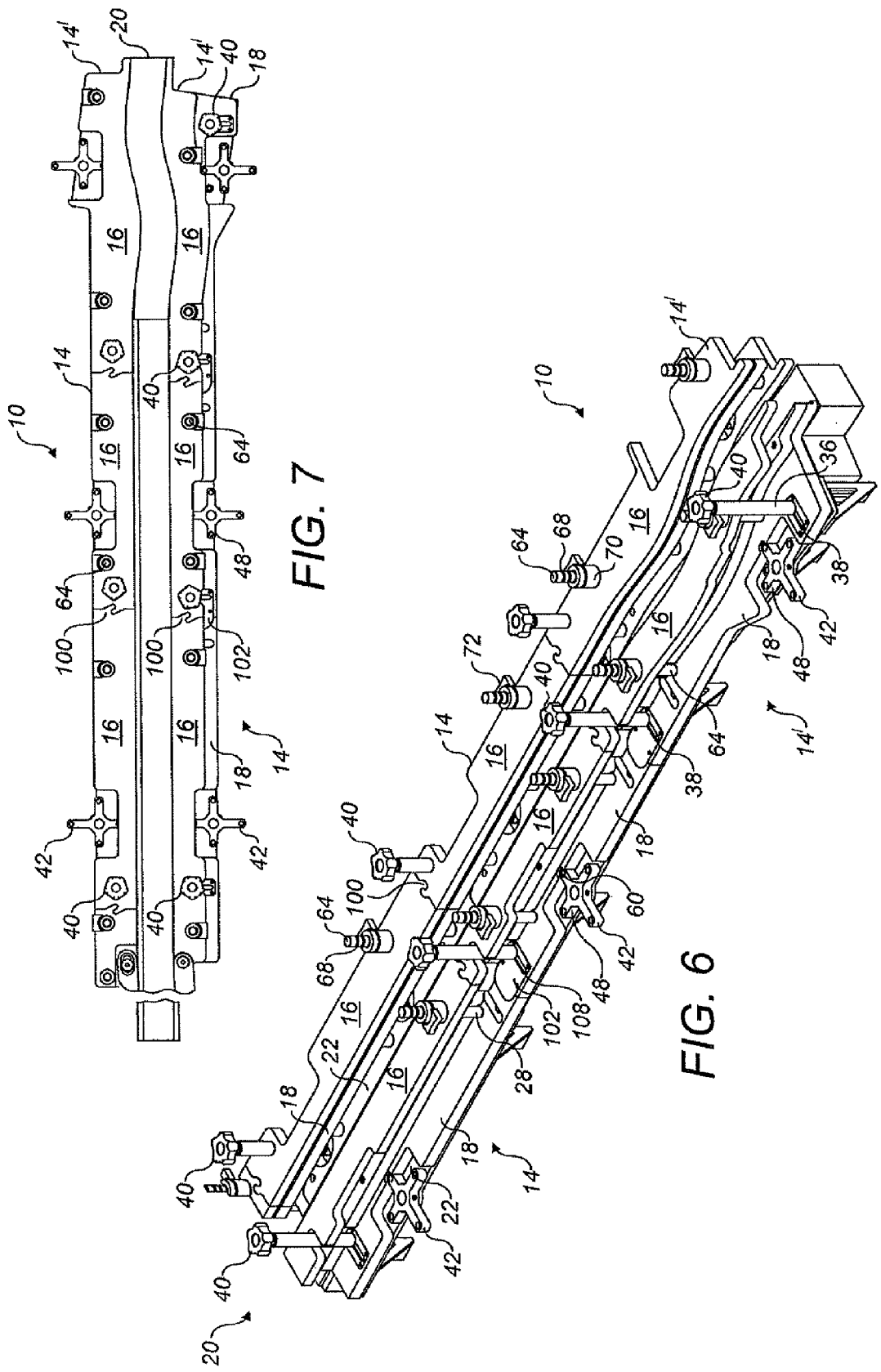

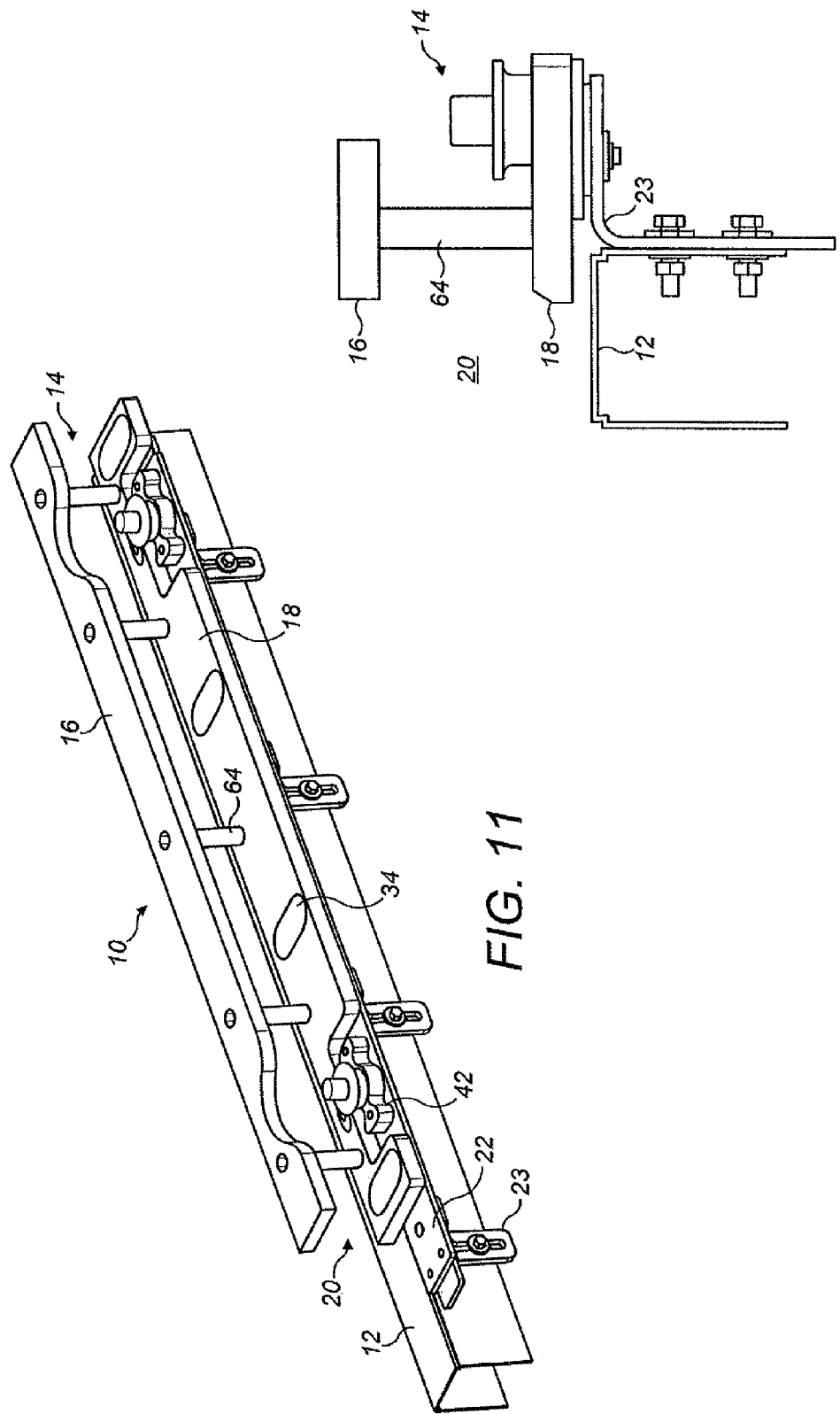

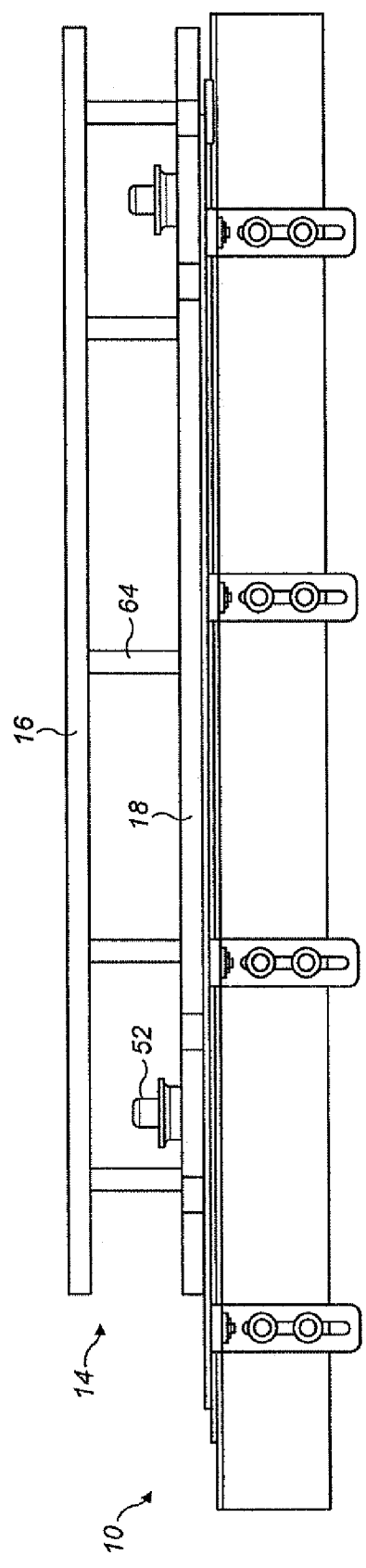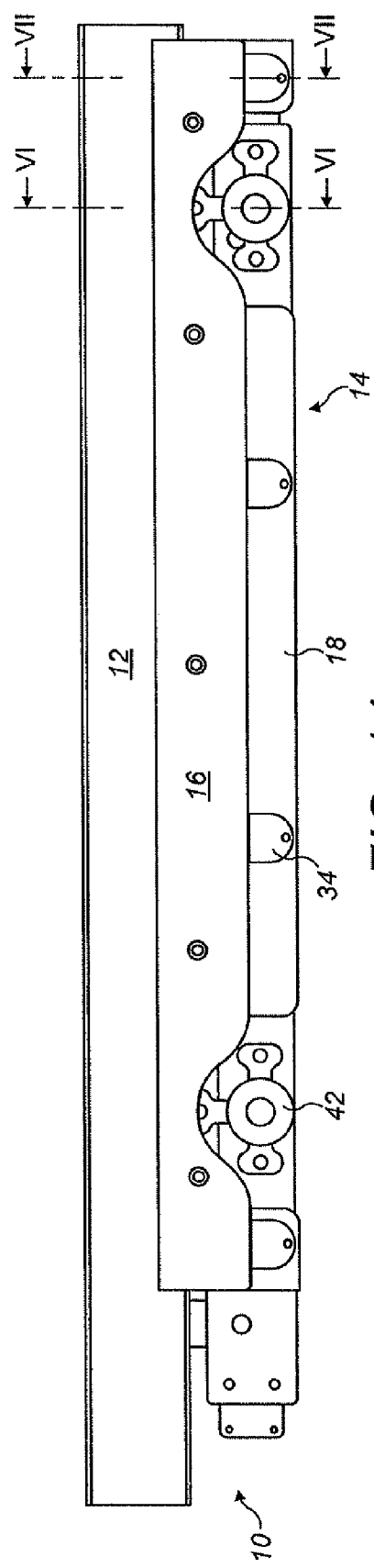

ADJUSTABLE CONVEYOR GUIDE

CROSS-REFERENCE TO RELATED APPLICATION

This Application is a Continuation-In-Part of Ser. No. 11/661,729, filed Dec. 27, 2007, now abandoned which is a Section 371 National Stage Application of International Application No. PCT/GB2005/003316, filed Aug. 25, 2005 and published as WO 2006/024830 A1 on Mar. 9, 2006, in English, which claims priority to United Kingdom Serial No. 0419393.4, filed Sep. 1, 2004, the contents of which are hereby incorporated by reference in their entirety.

This invention relates to an adjustable conveyor guide rail unit, in particular to a conveyor guide including one or more such guide rail units that may be adjusted to define a channel with varying discrete widths or of different discrete heights. The present invention has particular application in automated handling lines where containers, such as bottles, are processed (e.g. cleaned, filled, capped and/or labelled).

Automated handling lines usually comprise a number of machines, typically rotary handling machines, that fulfil various functions such as cleaning, assembling, filling, sealing or labelling an article. The articles are generally transported from machine to machine on automated conveyors. These conveyors typically comprise a moving floor, such as a conveyor belt.

One or more guide rails are employed to the sides of the conveyor path to ensure that articles follow any change in direction in the conveyor and to ensure that vibrations do not cause an article to topple. These guide rails (typically four, two to either side at different heights) are usually carried by guide rail units. Typically, a guide rail unit will be provided to either side of the conveyer path. For long sections of conveyor path, a series of guide rail units will line each side of the conveyor path. As conveyors often handle articles of differing sizes (e.g. a bottling line may handle bottles of varying sizes, both in width and height), it is advantageous for the conveyor guide rails to be adjustable. Such a provision is normally fulfilled by making the guide rail units removable, thus allowing them to be replaced by guide rail units with differently positioned guide rails.

However, this places a requirement for a range of differently-sized guide rail units to be made and also to be to hand, and the change-over operation is slow and time consuming.

Against this background, and from a first aspect, the present invention resides in an adjustable conveyor guide rail unit adapted for use in a conveyor guide to define the side of a channel through which an article may be conveyed, wherein the guide rail unit comprises a guide member operable to be set in a plurality of discrete positions relative to the channel as a whole, thereby allowing the width of the channel to be varied. The guide rail unit is coupled to a mount that includes a spider operable to set the guide member in the plurality of positions. The spider is rotatably mounted on a shaft, the spider having a plurality of legs of different lengths relative to the shaft, and being rotatable about the shaft to present a leg to a co-operating recess provided in the adjustable guide member.

Such an assembly is advantageous as it allows the width of the channel to be varied without requiring the time-consuming removal of parts, followed by replacement with other parts. Moreover, the provision of discrete positions allows a simple and quick to operate mechanism to be employed. By discrete positions, it is meant that a plurality of predetermined positions are available to be selected by a user. This is in contrast to the often more complex mechanisms employed in the prior art that allow a user to set any position within a range but that are time-consuming to operate.

The spider arrangement provides a simple way of operating the assembly. To adjust the channel to handle an article of different width, an operator need only rotate the spider to set the guide member at a different position. The spider may optionally be removably mounted on the shaft. A spring detent grub screw may optionally be provided to allow rapid adjustment of the spider between positions yet still firmly secure the spider into the correct positions. In addition, it allows spiders to be removed and replaced with similar spiders rapidly.

The spider may comprise legs of different length radiating from a body having a central hole sized to receive the shaft. Alternatively, the legs may be of the same length radiating from a body having an eccentrically positioned hole sized to receive the shaft.

Optionally, the spider comprises at least three mutually orthogonal legs of different lengths. Four legs may be provided to be mutually orthogonal, although more than four legs may be provided if arranged on two levels. In this latter arrangement, the spider may simply be flipped over to access either level, the legs being mutually orthogonal to the other legs in its level in a preferred arrangement. Other arrangements are possible, e.g. two legs 180° apart.

Optionally, the spider has legs that each terminate at an end of corresponding shape that includes a widened portion. Each spider is rotatable about the shaft to present an end of a leg to a correspondingly-shaped recess provided in the adjustable guide member thereby to set the guide member in the plurality of positions.

The combination of an enlarged portion to the end of the spider's leg and a correspondingly shaped recess allows the guide rail to be fixed in position when the end of the leg is received in the recess.

Various shapes of the end of the leg and recess may be used to effect the setting of the guide rail into position. For example, any combination of shapes may be used that provides an interference of parts that prevents the guide rail from being moved into or out of the channel defined by the guide rail. To this end, the recess may have a narrowed neck for receiving the leg of the spider and an enlarged head for receiving the end of the leg, such that the neck is narrower than the widened portion of the end. This arrangement provides the required interference that stops movement of the guide member and fixes the width of the channel. The end of each leg may be cross-shaped. Preferably, the end of each leg ends with a foot that forms the widened portion. Optionally, the foot is L-shaped, T-shaped, or Y-shaped. The foot may be jigsaw shaped.

For ease of operation, the spider may be movable along the shaft thereby allowing the foot to be moved clear of the recess. The spider may be removably mounted on the shaft. This may be to aid swapping of spiders having legs of different sizes, thereby allowing a greater range of widths of the channel to be selected. A spring detect grub screw may optionally be provided to allow rapid adjustment of the spider between indexed positions yet still firmly secure the spider into the correct positions. In addition, it allows spiders to be removed and replaced with similar spiders rapidly.

Preferably, the guide rail unit further comprises a second spider like the first spider and wherein the guide member has a second recess for receiving a leg of the second spider. This is advantageous where a single guide rail unit is employed per side of the channel or where unlinked guide rail units are used, as it provides two points of contact that support the guide member in position, thereby providing more accurate positioning. Optionally, one or more slots may be provided in the guide member to receive a correspondingly sized post, thereby constraining movement of the guide member. For example, the slot may extend laterally: this allows an operator to slide the guide member to vary the width of the channel, thereby disengaging the spider's leg from the recess and allowing rotation of the spider. The guide member can then be slid back such that the new leg is received within the recess. The different length of the leg will stop the guide member at a different position, thereby setting a different width of the channel. The guide member may optionally be set in position by clamping means. Conveniently, the clamping means may be mounted on the post extending through the slot in the guide member. For example, the clamping means may comprise a threaded thumb wheel mounted on a threaded post, thus allowing the guide member to be clamped in position by turning the thumb wheel.

Optionally, the guide rail unit may be used with a second, like guide rail unit that comprises a further guide member coupled to a further mount, wherein respective mounts are connected to a base, at least one of the mounts being connected via a spacer such that it is at a different height to the other mount. This allows the guide members to be set to different heights. Where two like guide rail units are used together, providing spacers of varying height for each guide member allows the guide members to be set to a desired height independently of one another.

Preferably, the guide rail unit further comprises a second guide member disposed above the first guide member. Advantageously, this allows articles to be supported at two different heights thereby reducing the likelihood of an article toppling over. The second guide member need not be directly above the first. For example, the second guide member may be set inwardly of the first. This may be advantageous (particularly when used in conjunction with a second like guide rail unit that faces the first across the channel) for example, when bottles with slender necks are being conveyed: the first guide member may be set to support the wide body of the bottle, whereas the second may be set to support the narrower neck of the bottle. Providing guide members of different widths would allow this whilst still conveniently allowing them to be mounted to supports provided by the lower guide member.

Optionally, the second guide member is mounted on at least one support attached to the first guide member disposed therebelow. This is convenient because the support will move with the guide member beneath it. Thus, the guide members move in unison when their positions are adjusted by rotation of the spider or spiders. Where slots are provided in the first guide member to receive a post, a slot may be positioned in the second guide member to receive the same post.

Preferably, the at least one support is configured to mount the second guide member in a plurality of discrete positions. Optionally, the support extends upwardly and the guide member has an associated height setting means that co-operates with an upper portion of the support thereby mounting the guide member on the support at the plurality of discrete positions. This presents the height setting means towards or at the top of the conveyor guide rail unit such that it may be operated easily. The height setting means are thus readily accessible and it is easy to see at what height the second guide member is being set. Optionally, the height setting means are provided on an upper surface of the guide member.

Advantageously, the height setting means may be operated with one hand. This may be achieved in a number of ways. For example, the at least one supports may comprise a plurality of narrowed portions and the height setting means may contain a moveable part arranged to be received within the narrowed positions thereby defining a plurality of mounting positions of the second guide member at different heights. Again, this corresponds to a simple arrangement that allows rapid adjustment of the height of the second guide member. Any number of narrowed portions may be provided on each of the at least one supports, although four is currently preferred. To allow greater range of adjustment, other supports may be provided with narrowed portions provided at different levels. The height setting means may comprise a collar sized and shaped to receive the support. Optionally, the collar is provided with a button that, when actuated, causes the moving part to move into and out of the narrowed portion. Thus, one-handed operation is conveniently effected.

The invention also extends to a conveyor guide including one or more such guide rail units. For example, the conveyor guide may comprise a channel through which articles may be conveyed, wherein a first side of the channel is defined at least in part by a plurality of any of the guide rail units described above. Advantageously, an adjacent pair of the plurality of guide rail units may be coupled together.

Optionally, the guide members of the adjacent pair of guide rail units are coupled together such that movement of one guide member causes a corresponding movement of the other guide member. Either alternatively or additionally, the second guide members of the adjacent pair of guide rail units may be coupled together such that movement of one second guide member causes a corresponding movement of the other second guide member. Either of these arrangements are convenient in that moving one guide rail or second guide rail ensures that adjacent guide rails move in unison. Thus, setting the position of one guide rail automatically sets the position of all other guide rails.

Preferably, the adjacent guide rail units are coupled by interlocking formations, such as substantially jigsaw shaped projections. Optionally, the conveyor guide further comprises a member that overlaps the interlocking formations and that extends from one of guide rail unit of the adjacent pair to be received in a recess provided in the other guide rail unit of the adjacent pair. This stops relative movement in the direction transverse to that prevented by the jigsaw shaped projections.

When using adjacent, coupled guide rail units, it may be preferable for each of the plurality of guide rail units to have only one spider and only one co-operating recess. In addition, it may be preferable for each of the plurality of guide rail units to have only one clamping means. This is because positioning and guidance of the guide rails as they move may be performed by the collective action of the plurality of spiders and clamping means.

From a second aspect, the present invention resides in a method of adjusting a conveyor guide assembly comprising a guide rail unit including a guide member arranged to define one side of a channel through which an article may be conveyed, the guide rail unit comprising a rotatable spider mounted on a shaft, the spider having a plurality of legs of different lengths relative to the shaft, and the guide member having a slot sized and positioned to receive a leg of the spider, the method comprising changing the position of the guide member from a first position to a second position of a plurality of discrete positions relative to the guide rail unit as a whole, thereby adjusting the width of the channel by disengaging the leg of a spider from the slot of the guide member, rotating the spider, and engaging a different leg of the spider in the recess of the guide member.

Preferred features of the above method are set out in the appended claims.

In order that the invention can be more readily understood, reference will now be made by way of example only, to the accompanying drawings in which:

FIG. 1 is a perspective view of a conveyor guide according to the present invention from above and to one side;

FIG. 2 corresponds to FIG. 1 but with some parts removed to allow others to be seen;

FIG. 6 is a perspective view of a conveyor guide comprising a series of guide rail units on each side;

FIG. 7 is a plan view of the conveyor guide of FIG. 6;

FIG. 11 is a perspective view of a conveyor guide according to the present invention from above and to one side;

FIG. 12 is an end view of the conveyor guide of FIG. 11;

FIG. 13 is a side view of the conveyor guide of FIG. 11;

FIG. 14 is a plan view of the conveyor guide of FIG. 11;

Figure 1:
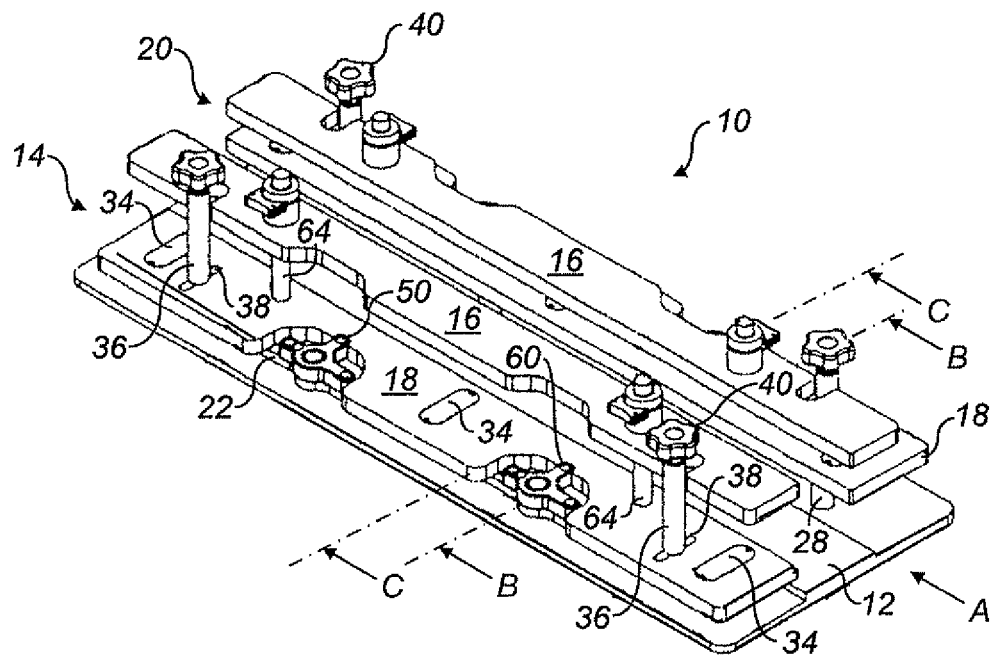
Figure 2:
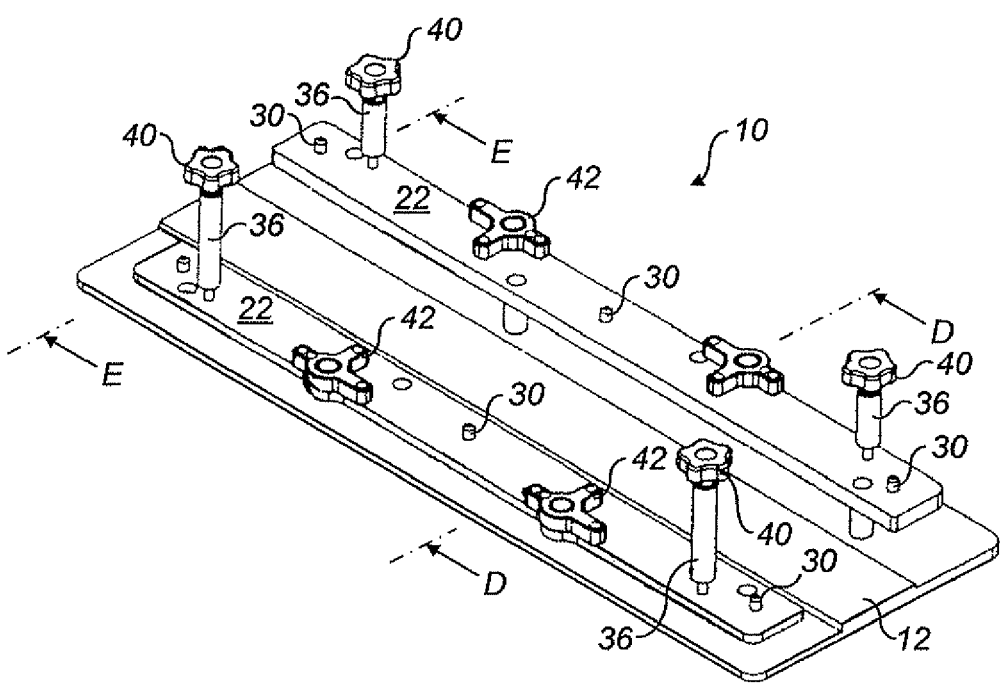

A conveyor guide 10 is shown in FIG. 1, although mounted to a plain base plate 12. The plain base plate 12 is flat, save for a stepped plateau extending along its centre. In normal use, the conveyor guide is likely to be mounted on either side of a conveyor belt or the like. The conveyor guide 10 defines a short straight channel, although the channel could be of any length and could define a curved or kinked path.

The conveyor guide 10 comprises a pair of guide rail units 14, each unit 14 comprising an upper guide rail 16 and a lower guide rail 18. The guide rails 16, 18 are plate-like and are arranged to define a channel 20 that extends along the length of the conveyor guide 10. The guide rail units 14 face each other with their inner edges providing contact surfaces that support an article conveyed along the conveyor 10. The two units 14 broadly correspond and as a result, the following description can be taken to refer to either unit 14, unless noted otherwise. The method of mounting both of the guide rail units 14 to the base plate 12 will now be described.

Figure 3A:
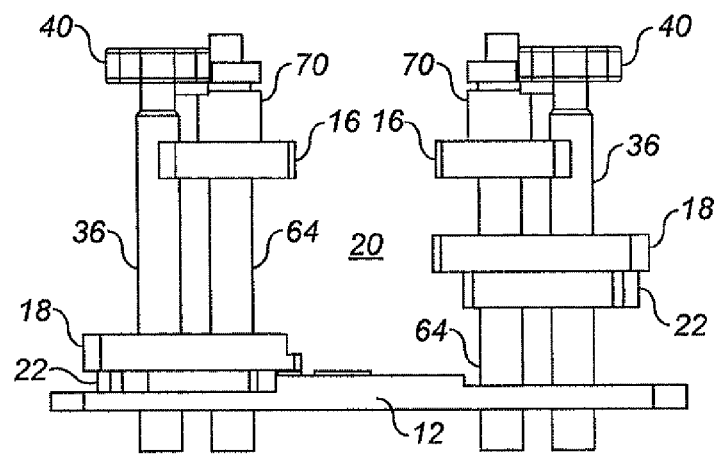
FIG. 3a is a view taken along arrow A of FIG. 1, FIGS. 3b and 3c are sections through lines B-B and C-C respectively of FIG. 1, and FIGS. 3d and 3e are sections through lines D-D and E-E respectively of FIG. 2.
Figure 3B:
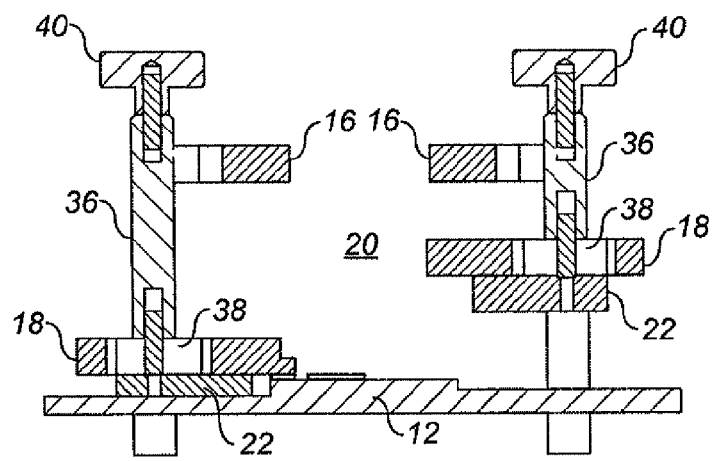
Figure 3C:
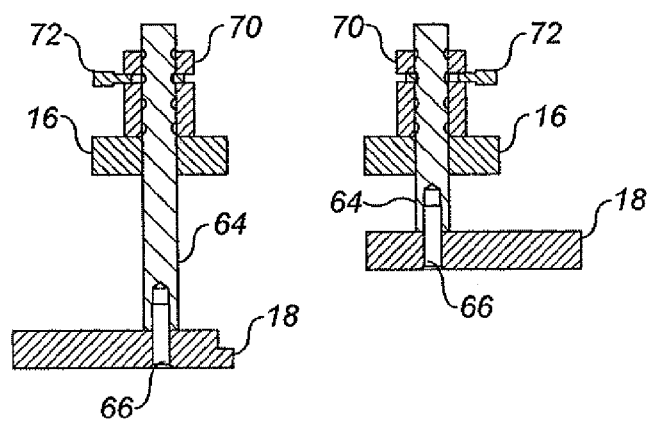
Figure 3D:
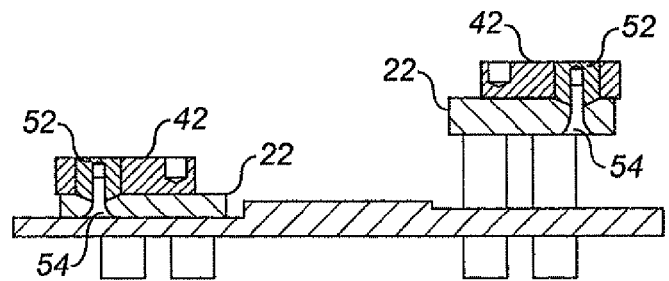
Figure 3E:
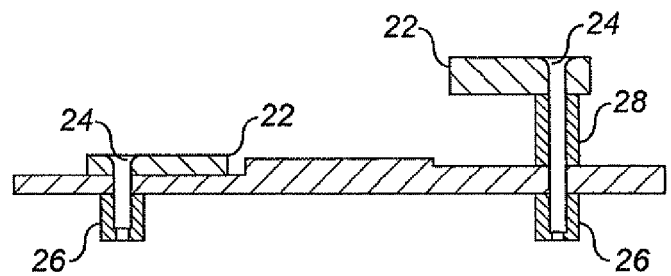

A flat core plate 22 is fastened to the base plate 12, as best shown in FIG. 3e. The core plate 22 is fastened by a pair of screws 24, each of which passes through a hole provided in the core plate 22 to fasten against a screw thread provided on a mounting foot 26. One of the core plates 22 is fastened in this manner to lie flat against the base plate 12. However, the other core plate 22 is separated from the base plate 12 by spacers 28 that are provided with holes that receive screws 24. Thus, the core plates 22 reside at different heights.

The lower guide rail 18 couples to the core plate 22 such that the lower guide rail 18 can slide laterally to define a varying width of the channel 20. This lateral movement is constrained by five complementary slot and post arrangements, each comprising a post of circular cross-section received within a slot elongated in the lateral direction. Three of these slot and post arrangements comprise a screw 30 that projects through the core plate 22 to be received within a slot 32. Covers 34 are provided for the slots 32, as best seen in FIG. 1. The remaining two post and slot arrangements are provided by shafts 36 that pass through slots 38 provided in the lower guide rail 18 and upon which a thumb wheel 40 is provided. The shaft 36 has a narrowed portion that passes through the slot 38 that is stepped to an enlarged portion to present a shoulder that abuts against the lower guide rail 18. The thumb wheel 40 may be turned to urge the shoulder of the shaft 36 against the lower guide rail 18 and clamp the lower guide rail 18 in position.

Figure 4:
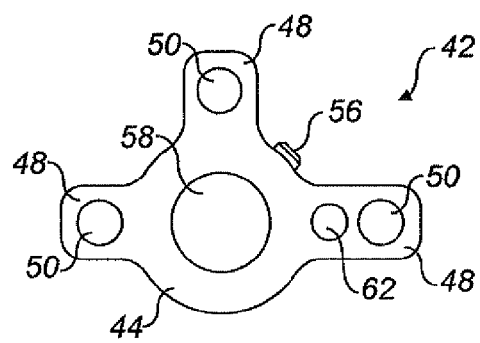
FIG. 4 is a plan view of one of the spiders of FIG. 1.

The position of the lower guide rail 18 is easily set in one of three indexed positions as follows. A pair of spiders 42 are provided for each lower guide rail 18, as best seen in FIG. 4. The spider 42 generally comprises an annular body 44 with a central aperture 46, and three legs 48 of varying lengths extending radially from the body 44 at 90° intervals. Each leg 48 is identifiable by a coloured spot 50, a particular spot 50 being associated with a particular length of leg 48. All spiders 42 mounted on the unit 14 at any one time correspond and so each has the same colour spots 50.

Each spider 42 is rotatably mounted on a shaft 52 that is held in position by a screw 54 that projects through the core plate 22. Each spider 42 is provided with a spring detent grub screw 56 that has a rounded tip 58 that projects into the central aperture 46 of the spider 42. Each shaft 52 is provided with three dimples (not shown) that receive the rounded tip 58 of the grub screw 56. Thus, to move the spider 42 some force is required to overcome the spring of the grub screw 56, but the spiders 42 can then be rotated to a new position or lifted off the shaft 52. Resistance will be felt when each spider 42 reaches the next position when the rounded tip 58 is received in the next dimple, thus providing indexed positioning that corresponds to each leg 48 being aligned laterally.

The lower guide rail 18 is positioned by sliding it laterally such that the laterally extending legs 48 are received within slots 60 provided in the lower guide rail 18. The lower guide rail 18 is slid until the legs 48 touch the back of the slot 60 and then the thumb wheels 40 are turned to clamp the lower guide rail 18 into position. Rotating the spiders 42 allows three different positions to be selected, the varying lengths of the legs 48 ensuring channels 20 of varying widths are formed.

The spring detent grub screw 56 also allows the spiders 42 to be lifted off their shafts 52 easily and replaced with another set of spiders 42 with different leg lengths. The different sets of spiders 42 may be identified by using different colours for the spots 50, or by providing a further colour-coded spot 62, as shown in FIG. 4.

Figure 5:
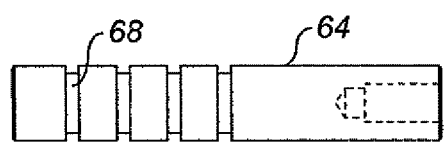
FIG. 5 is a side view of one of the pillars of FIG. 1.

The lateral position of the upper guide rail 16 is adjusted in unison with the lateral position of the lower guide rail 18 because the upper guide rail 16 is attached to pillars 64 that are in turn attached to the lower guide rail 18 by screws 66. A pillar 64 is shown in more detail in FIG. 5, where it can be seen that its upper portion is provided with four equispaced, narrowed rings 68, the purpose of which will be described below.

The upper guide rail 16 has a pair of apertures sized to receive the pillars 64. The upper guide rail 16 has a collar 70 extending above each aperture that surrounds the pillar 64 when mounted thereon and contains a spring button 72 that operates an element that projects into the collar 70 to engage in a ring 68 of the pillar 64, thereby securing the upper guide rail 16 at a desired height. The button 72 may be pressed to release the element from the ring 68, such that the upper guide rail 16 may be moved to a new height and fixed in position by allowing the element to engage in a new ring 68. This simple design allows quick and convenient adjustment. The adjustment mechanism (the button 72) is provided at the top of the pillar 64 and so is easy to access. In particular, this allows a user to work the height adjustment mechanism using only one hand: the collar 70 and bottom 72 may be squeezed between finger and thumb and the upper guide rail 16 either lifted or dropped into the desired position.

The upper guide rails 16 in this embodiment are intended to reside at the same heights. As the height of the lower guide rails 18 are different, pillars 64 of correspondingly different heights are used for each of the guide rail units 14. The pillars 64 are interchangeable to allow a greater range of heights of the upper guide rails 16, 18.

Hence, the conveyor guide 10 comprises guide rails 16, 18 that are adjustable in both lateral and vertical directions. Lateral adjustment of upper 16 and lower 18 guide rails is performed using the spiders 42 that provide three indexed positions for each guide rail pair 16, 18. Although different combinations of leg lengths could be used for each guide rail unit 14, it is currently envisaged that the same leg length will be used for each guide rail unit 14 as this preserves a common centre line of the channel 20. Vertical adjustment may be effected separately for upper 16 and lower guide rails 18. The height of the lower guide rails 18 may be adjusted using spacers 28 of varying heights to create a variable offset of core plate 22 from base plate 12. The height of the upper guide rails 16 may be adjusted by varying the mounting position between the four narrowed rings 68 provided on the pillars 64.

A skilled person will appreciate that the above embodiment may be varied in many different respects without departing from the scope of the present invention.

The Figures show a channel 20 defined by a pair of guide rail units 14. However, this need not be the case; the channel 20 may be defined by more or fewer guide rail units 14. For example, a single guide rail unit 14 akin to one of those shown in the Figures may define one side of a channel 20 whereas the other side of the channel 20 may be defined by a feed screw that is rotated to pitch containers along the conveyor guide 10. Alternatively, each side of a channel 20 may comprise more than a single guide rail unit 14, as a series of two or more similar or different guide rail units 14 for example, such as that shown in FIGS. 6 and 7.

FIGS. 6 and 7 show a conveyor guide 10 comprising a series of guide rail units 14 arranged along either side of a channel 20. Each guide rail unit 14 is broadly similar to those described above with respect to FIGS. 1 to 5. Thus, the following description concentrates on the differences in the guide rail units 14 rather than unnecessarily repeating description of like parts.

As best seen from FIGS. 6 and 7, the guide rail units 14 are linked by co-operating jigsaw cut-outs 100. The jigsaw cut-outs 100 are provided at either end of the guide rail units 14, both in each upper guide rail 16 and each lower guide rail 18. The jigsaw cut-outs 100 allow the series of guide rail units 14 to be assembled such that each unit 14 adopts its correct position. Moreover, providing the jigsaw cut-outs 100 in the guide rails 16 and 18 ensures that all the guide rails 16 and 18 move together as they are adjusted. Providing the jigsaw cut-outs 100 in both the lower guide rails 18 and the upper guide rails 16 is not strictly necessary as the upper guide rails 16 are mounted on the lower guide rails 18 thereby ensuring they move together. Hence, the jigsaw cut-outs 100 need only be provided in either upper or lower guide rails 16, 18. Providing jigsaw cut-outs 100 in both ensures better alignment of both upper and lower guide rails 16, 18 though.

As the guide rails 16 and 18 move in unison, it is no longer advantageous to include two spiders 42 per guide rail unit 14. Instead only a single spider 42 is provided per guide rail unit 14: the alignment and correct positioning of the guide rails 16 and 18 is ensured by the spiders 42 of the many guide rail units 14 acting collectively. Similarly, only a single shaft 36 and thumb wheel 40 is provided per guide rail unit 14 to provide a clamping means for securing the guide rail units 14 firmly in place. This reduction in parts will lead to reduced guidance for each guide rail unit 14: however, the collective action of all shaft 36 and slot 38 pairs across the series of guide rail units 14 ensures sufficient guidance is provided during adjustment of the guide rails 16 and 18.

Figure 8:
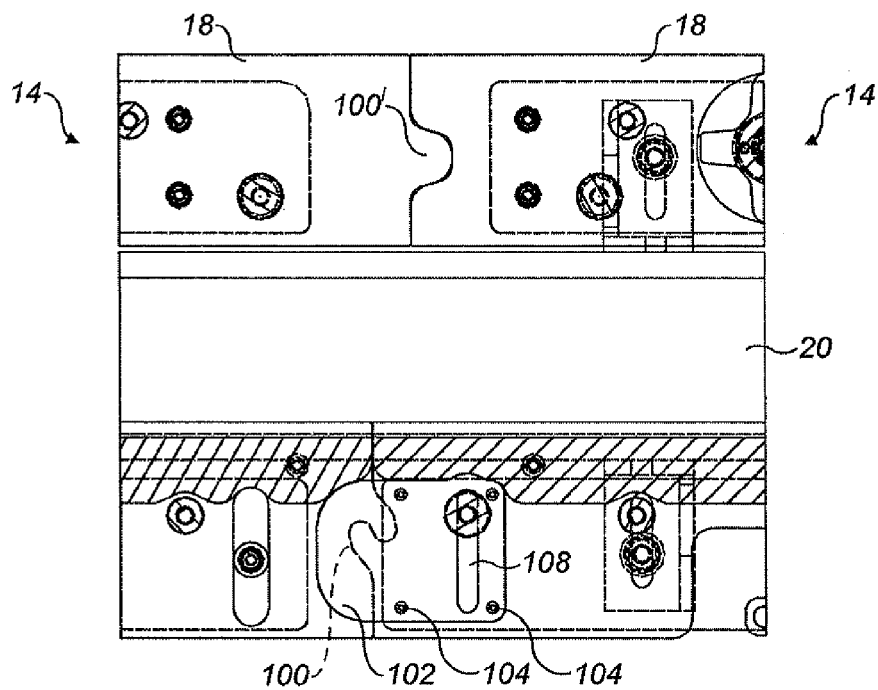
FIG. 8 is a detail from FIG. 7, showing some parts ghosted.
Figure 9:
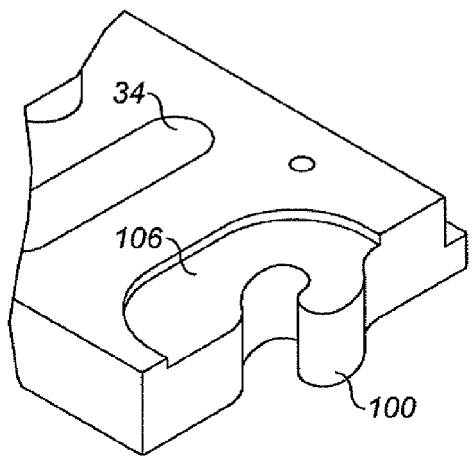
FIG. 9 is a perspective view of an end of a lower guide rail.
Figure 10:
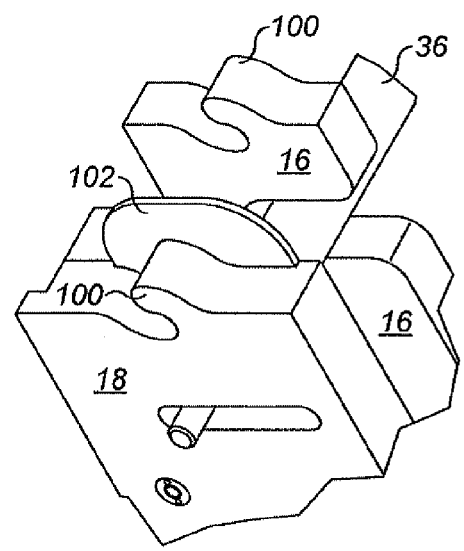
FIG. 10 is a perspective view of an end of a guide rail unit.
Figure 15:
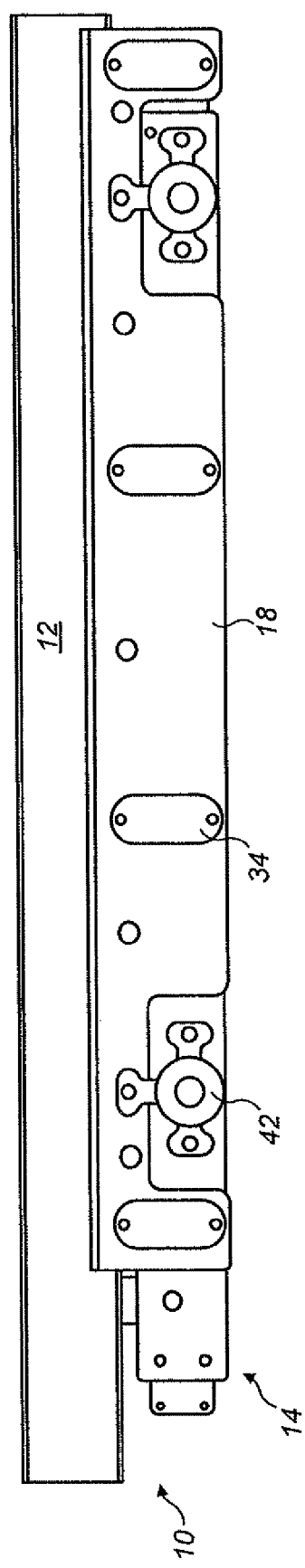
FIG. 15 is a plan view of the conveyor guide of FIG. 11 with the top guide rail removed to show more clearly the components beneath it.

FIGS. 8, 9 and 10 illustrate a further feature present in the conveyor guide 10 of FIGS. 6 and 7 that assists correct coupling of adjacent guide rail units 14. FIG. 8 best shows a clamp plate 102 that is attached to the left of a lower guide rail 18 by four screws 104. The clamp plate 102 projects beyond the left edge of the lower guide rail 18 across the area presented by the top of jigsaw cut-out 100. The right part of each lower guide rail 18 is provided with a recess 106 sized and shaped to receive the projecting section of the clamp plate 102. The shaft 36 attached to thumb wheel 40 projects through clamp plate 102 as it passes through lower guide rail 18 to fix to core plate 22. Hence, clamp plate 102 is provided with an aperture 108 that, when assembled, lies in registration with the slot 38 provided in lower guide rail 18. The shoulder provided in shaft 36 abuts against the clamp plate 102 and so bears against the clamp plate 102 when the thumb wheel 40 is tightened. The projecting clamp plates 102 are provided to prevent one lower guide rail 18 (and, hence the entire guide rail unit 14) lifting up relative to its neighbour.

The width of the channel 20 may be varied by adjusting the lateral positions of the guide rails 16 and 18 as follows. The thumb wheel 40 on each guide rail unit 14 along the length of conveyor guide 10 is loosened and the guide rails 16 and 18 slid into the channel 20, as guided by the slot and post combinations (30 and 32, and 36 and 38). Moving one guide rail 16 or 18 will see all other guide rails 16 and 18 move in unison. This allows the spiders 42 to be rotated to present another of the four different length legs 48 to the slot 60 provided in the lower guide rail 18 (or, the spider 42 may be replaced by another spider 42). As before, the lengths of legs 48 are colour-coded. The same length of leg 48 should be selected for all spiders 42 on the same side of the conveyor guide 10 (and, preferably, the same length of leg 48 should be selected for both sides). With each spider 42 set in position, the guide rails 16 and 18 may be moved back in unison such that each spider's leg 48 is received in the associated slot 60 parallel in the lower guide rails 18 such that the spiders can stop the guide rails 16 and 18 at the correct position. The thumb wheels 40 are then tightened to secure the guide rails 16 and 18 in place.

As will be appreciated, the height adjustment of the guide rails 16 and 18 is performed as previously described, i.e. with the use of spacers 28 for the lower guide rails 18 and with the use of the narrowed rings 68 provided on the pillars 64 for the upper guide rails 16.

The shape of the jigsaw cut-outs 100 is not critical provided they serve the function of guiding adjacent guide rail units 14 into alignment. The interlocking formations 100 of FIG. 7 may be replaced by many other designs, both interlocking and otherwise. An alternative is shown at 100' of FIG. 8. Moreover, the use of clamp plates 102 is optional and may be omitted, for example where lifting of guide rail units 14 is not envisaged or may be tolerated.

Figure 21:
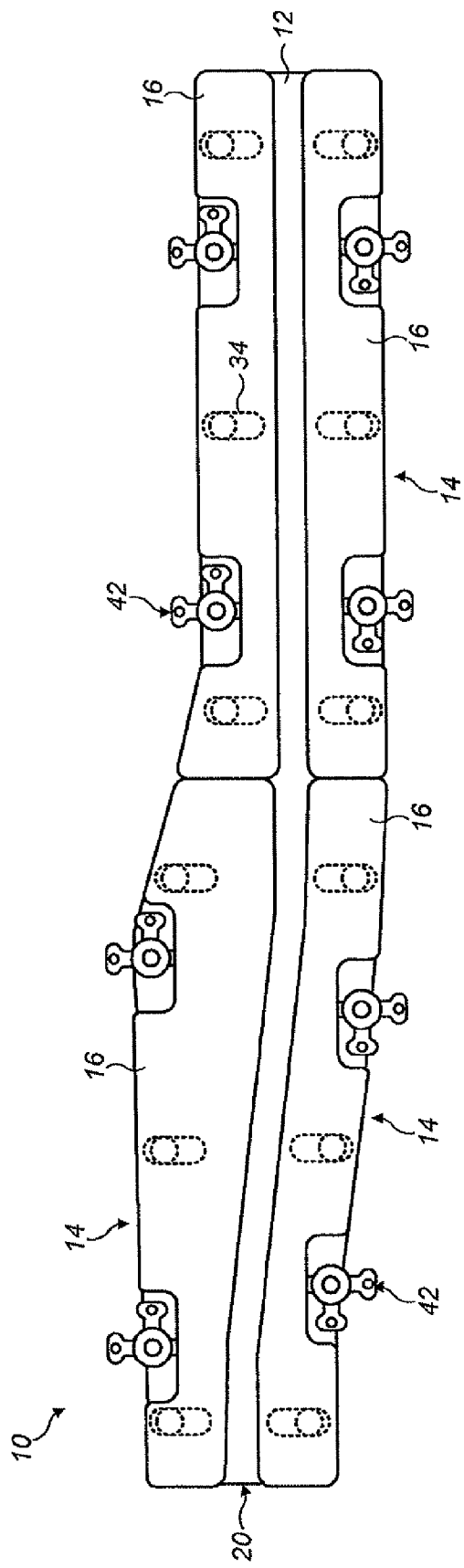
FIG. 21 is a perspective view of a conveyor guide comprising a series of guide rail units on each side.

Another embodiment of a conveyor guide 10 is shown in FIG. 21 that comprises four guide rail units 14 that together define a channel 20 through which articles are conveyed. A rail unit 14 of this embodiment is shown in more detail in FIG. 11. This Figure shows only a single guide rail unit 14 for the sake of clarity. The guide rail unit 14 is mounted to a plain base beam 12. In normal use, guide rail units 14 are likely to be mounted on either side of a conveyor belt or the like, as per the embodiment of FIGS. 1 to 10. The conveyor guide 10 may define a short straight channel, although the channel could be of any length and could define a curved or kinked path.

Figure 17:
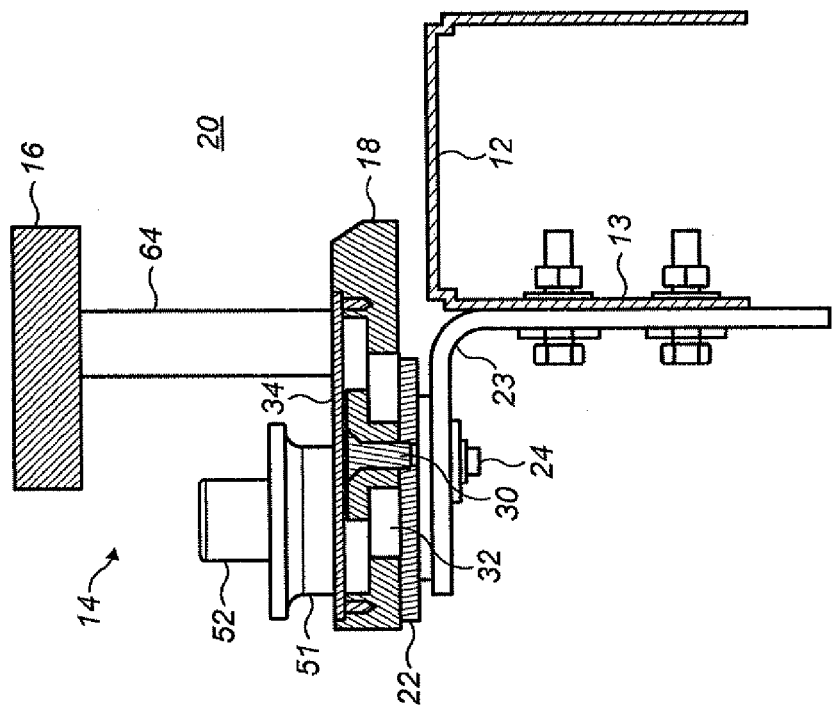
FIG. 17 is a section through line XVII-XVII of FIG. 14.
Figure 16:
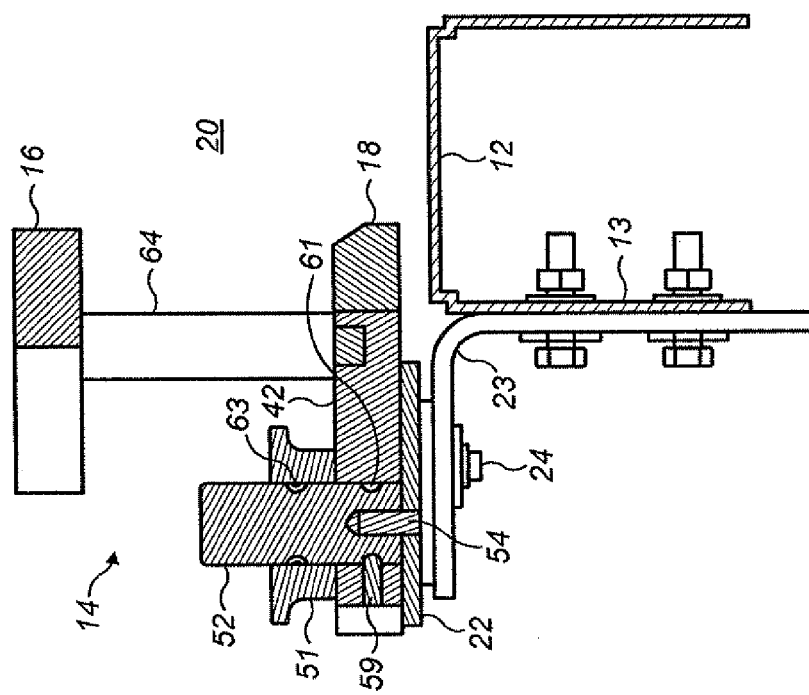
FIG. 16 is a section through line XVI-XVI of FIG. 14.

The guide rail unit 14 comprises an upper guide rail 16 and a lower guide rail 18. The guide rails 16, 18 are plate-like and define the channel 20 that extends along the length of the conveyor guide 10. The guide rail unit 14 faces a like guide rail unit 14 with their inner edges providing contact surfaces that support an article conveyed along the conveyor 10. The method of mounting the guide rail unit 14 to the base beam 12 will now be described with reference to FIGS. 16 and 17.

A flat core plate 22 is fastened to an angled bracket 23 that in turn is fastened to an upright side 13 of the base beam 12. The core plate 22 is fastened to the bracket 23 by a pair of screws 24.

The lower guide rail 18 couples to the core plate 22 such that the lower guide rail 18 can slide laterally to define a varying width of the channel 20. This lateral movement is constrained by three complementary slot and post arrangements, each comprising a post of circular cross-section received within a slot elongated in the lateral direction. These slot and post arrangements comprise a screw 30 that is secured to the core plate 22 to stand upright within a slot 32 provided in the lower guide rail 18. Each screw 30 has an enlarged head that is accommodated in a widened top half of each slot 32. This arrangement ensures that the lower guide rail 18 can slide across the core plate 22, but cannot lift up from the core plate 22. Covers 34 are provided for the slots 32, as best seen in FIG. 11.

Figure 18:
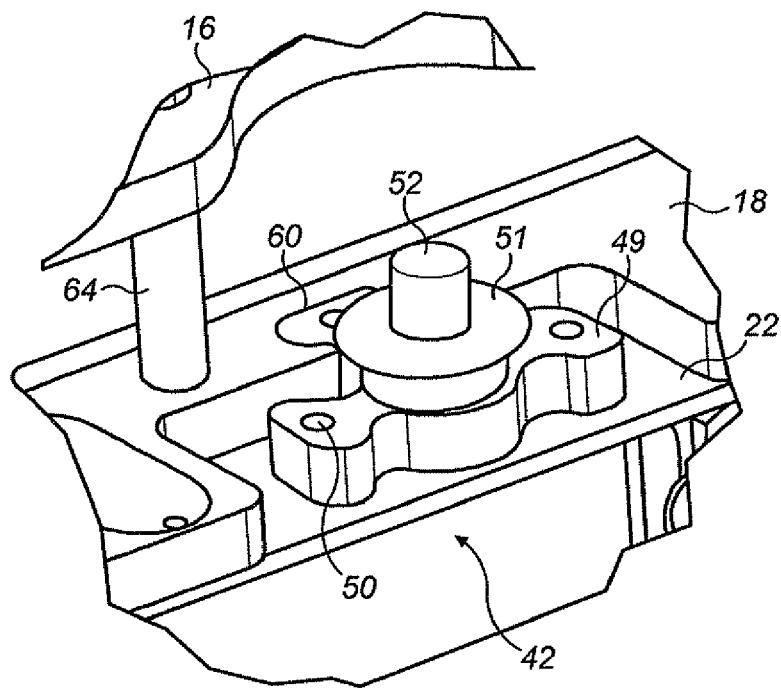
FIG. 18 is a perspective detail taken from FIG. 11 to show the spider in greater detail.
Figure 19:
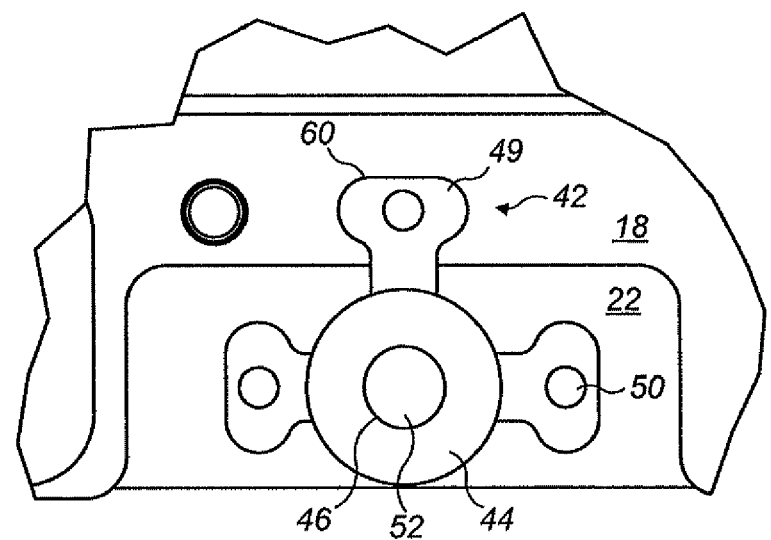
FIG. 19 is a plan view of the spider of FIG. 18.

The position of the lower guide rail 18 is easily set in one of three indexed positions as follows. It will be appreciated that setting the position is broadly similar when compared to what has been described with respect to FIGS. 1 to 10. A pair of spiders 42 are provided for each lower guide rail 18. Similar to the spider 42 of FIG. 4, each spider 42 of this embodiment generally comprises an annular body 44 with a central aperture 46, and three legs 48 of varying lengths extending radially from the body 44 at 90° intervals (as best seen in FIGS. 18 and 19). However, the spider 42 of FIGS. 18 and 19 differs in that each leg 48 has an enlarged foot to form a t-shaped end 49. Each leg end 49 has a corresponding size and shape that matches a co-operating recess 60 formed in the lower guide rail 18. Thus, the end 49 of each leg 48 may be received snugly within the recess 60. Each leg 48 is identifiable by a differently-coloured spot 50, a particular spot colour 50 being associated with a particular length of leg 48. All spiders 42 mounted on the unit 14 at any one time correspond and so each has the same colours of spots 50.

Each spider 42 is rotatably mounted on a shaft 52 that is held in position by a screw 54 that projects through the core plate 22. Movement of the spiders 42 is aided by a grip 51 provided on the top of each spider 42. The grip 51 is shaped such that it is easily gripped by a user changing the width of the channel 20. Each spider 42 is also provided with a spring detent grub screw 59 that has a rounded tip that projects into the central aperture 46 of the spider 42. Each shaft 52 is provided with three dimples 61 that receive the rounded tip of the grub screw 59. Thus, to move the spiders 42 some force is required to overcome the spring of the grub screw 59, but the spiders 42 can then be lifted clear of the lower guide rail 18, rotated to a new position and lowered back into position. Resistance will be felt when each spider 42 reaches the next position as the rounded tip of the screw 59 is received in the next dimple 61, thus providing indexed positioning that corresponds to each leg 48 being aligned laterally.

The lower guide rail 18 is positioned by sliding it laterally with the spiders 42 held clear. To this end, a second set of dimples 63 is provided on the shaft 52 to allow the user to set the spiders 42 in a raised position. The slot and post arrangements constrain the lower guide rail 18 to move laterally in and out of the channel 20. The lower guide rail 18 is slid until the recess 60 align with the ends 49 of the legs 48. Then the spiders 42 are pushed down such that their ends 49 are received within the recess 60 and the grub screw 59 is received within a lower dimple 61, thereby fixing the lower guide rail 18 into position. Rotating the spiders 42 allows three different positions to be selected, the varying lengths of the legs 48 ensuring channels 20 of varying widths are formed.

The spring detent grub screw 59 also allows the spiders 42 to be lifted off their shafts 52 easily and replaced with another set of spiders 42 with different leg lengths. The different sets of spiders 42 may be identified by using different colours for the spots 50, or by providing a further colour-coded spot.

The lateral position of the upper guide rail 16 is adjusted in unison with the lateral position of the lower guide rail 18 because the upper guide rail 16 is attached to pillars 64 that are in turn attached to the lower guide rail 18 by screws (not shown).

Hence, the conveyor guide 10 comprises guide rails 16, 18 that are adjustable in the lateral directions. Vertical adjustment may be provided as well, for example using the slotted pillar arrangement described with respect to FIGS. 1 to 10. Lateral adjustment of upper 16 and lower 18 guide rails is performed using the spiders 42 that provide three indexed positions for each guide rail pair 16, 18. Although different combinations of leg lengths could be used for guide rail units 14 facing each other across the channel 20, it is currently envisaged that the same leg length will be used for each guide rail unit 14 as this preserves a common centre line of the channel 20.

Other variations to the embodiments described above are possible without departing from the scope of the invention defined by the claims. For example, not all guide rail units 14 need be height and/or width adjustable. For example, only one side of a channel 20 need be provided with a width-adjustable guide rail unit 14 to allow variation of the width of the channel 20. The other side of the channel 20 may have a guide rail unit 14 that is neither height nor width adjustable. However, it is preferred to provide width-adjustable guide rail units 14 on both sides of the channel 20 because this allows the width of the channel 20 to be adjusted while preserving the position of its centre line. A guide rail unit 14 within a conveyor guide 10 may be width-adjustable and/or height adjustable and a conveyor guide 10 may comprise any combination of such guide rail units 14 and also further include non-adjustable guide rail units 14.

The above embodiment describes a conveyor guide 10 that defines a straight path. This need not be the case: the conveyor guide 10 may define a curved or kinked channel 20. An example of a curved path is shown in FIGS. 6 and 7 where the rightmost guide rail units 14' define a meandering channel 20. These Figures also show that straight and curved guide rail units 14 and 14' can be freely mixed to define a required path. As can be seen from FIGS. 6 and 7, curved guide rail units 14' correspond to the other straight guide rail units 14, save for the shape of the channel 20 they define. The dimensions of the conveyor guide 10 may be freely varied to suit needs. A currently preferred application is for use in an automated bottling line, where bottles with capacities from, for example, 250 ml to 2 l may be conveyed.

How the articles are to be conveyed is also a matter of choice. The articles may be conveyed through the conveyor guide 10 by a belt that supports the articles from below, by a carrier that grips the articles from above (e.g. that grips the necks of bottles), or by rotating rollers disposed periodically along a conveyor line or a feed screw that imparts motion to articles that contact them as they pass by.

The above embodiment comprises four guide rails 16, 18, the upper of which 16 are at a common height and the lower of which 18 are at different heights. Other numbers of guide rails may be used to define the channel 20, e.g. 3, 5, 6, etc. Of course, each guide rail unit 14 need not carry the same number of guide rails 16, 18. The height of each guide rail 16, 18 may be freely chosen.

The guide rails 16, 18 shown in the accompanying Figures are thin with little depth. However, the depth of the guide rails may be freely chosen. For example, each guide rail unit 14 may carry a single deep guide rail 16, 18 for supporting a straight-sided bottle or the like. The widths of the guide rails 16, 18 may also be varied. This would allow the width of the channel 20 to vary with height, e.g. it may be narrower at the top to correspond to the narrowest neck of a bottle.

Whilst three-legged spiders 42 are shown in the Figures, the number of legs may be freely chosen and arranged as desired, as described above. Also, the number of spiders 42 per guide rail unit 14 may be varied.

Figure 20A:
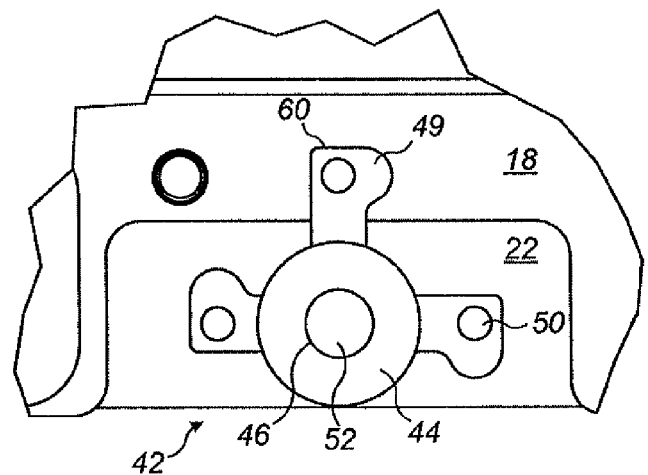
FIGS. 20a to 20c are plan views of alternative designs of spiders for use in embodiments of the present invention.
Figure 20B:
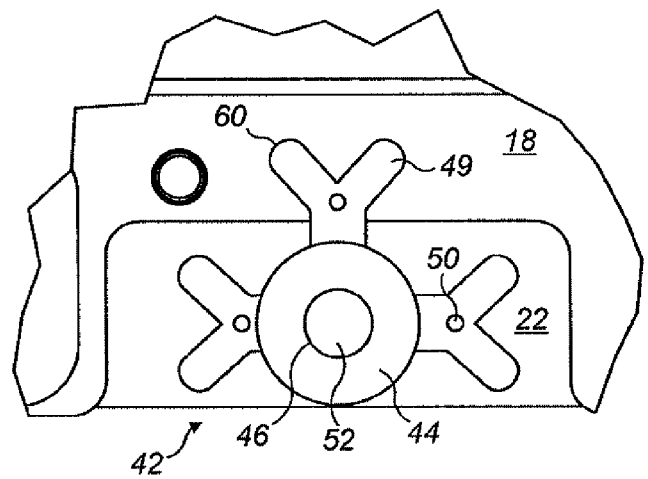
Figure 20C:
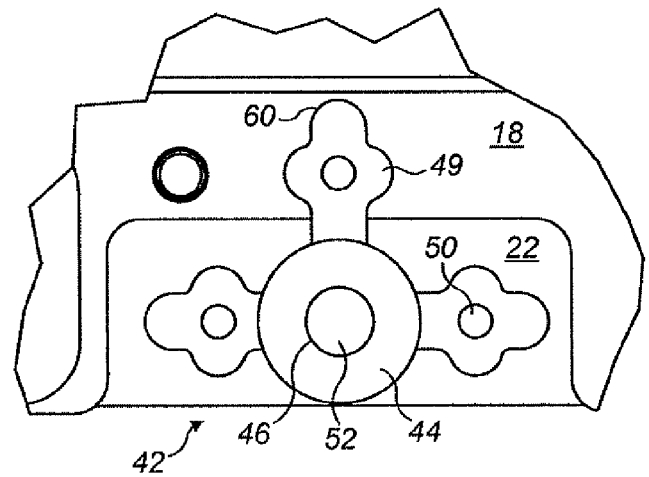

Variations of the spiders 42 are shown in FIGS. 20a to 20c although other designs of spiders 42 are possible that still allow the guide rail 16,18 to be set in position, as will now be explained. The recesses 60 provided in the lower guide rails 16 are of a corresponding size and shape to receive the ends of the spider's legs 48. FIGS. 18 and 19 show the spider 42 illustrated in FIGS. 11 to 13 and described above. Each leg of the spider 42 comprises a T-shaped foot 49 at the end of each leg 48. Thus, the two ends of the foot 49 to either side of the main body of the leg 48 provide interference with the sides of the recess 60 to fix the lower guide rail 16 in place. However, only a single end of a foot 49 need be used to provide the required interference, for example as shown in the embodiment of FIG. 20a. In this variation, each leg 48 of the spider 32 ends with an L-shaped foot 49.

FIG. 20b shows a spider 42 with legs 48 that terminate in Y-shaped ends 49. As will be clear, the Y-shape provides the required interference fit. The enlarged portion providing the interference need not be provided at the end of each leg 48. An embodiment that follows this reasoning is shown in FIG. 20c where each leg 48 terminates in a cross shape 49.

The guide rail units 14 of FIGS. 11 to 21 may be linked. The link may be rigid such that adjacent guide rail units 14 move in unison, or may be flexible such that adjacent guide rail units 14 may be moved one at a time. A link like that shown for the embodiment of FIGS. 1 to 10 may be used.

The manner in which the guide rails 16, 18 are held in position can also be freely chosen. The clamping means of FIGS. 1 to 10 provided by the thumb wheels 40 for the lower guide rails 18 and the push button mechanism 72 for the upper guide rails 16 are but merely described for the purposes of illustration. The number of narrowed rings 68 provided in the pillars 64, along with their positions, may also be varied. The inclusion of core plates 22 is also optional. For example, the shafts 52 about which the spiders 42 rotate may be attached directly to the base plate 12 where the lower guide rails 18 are to be positioned immediately above the base plate 12.

The invention claimed is:

1. An adjustable conveyor guide rail unit adapted for use in a conveyor guide to define the side of a channel through which an article may be conveyed, wherein the guide rail unit comprises a guide member operable to be set in a plurality of discrete positions relative to the channel as a whole, thereby allowing the width of the channel to be varied, and wherein the guide member is coupled to a mount that includes a spider operable to set the guide member in the plurality of positions, the spider being rotatably mounted on a shaft, the spider having a plurality of legs of different lengths relative to the shaft, and being rotatable about the shaft to present a leg to a co-operating recess provided in the adjustable guide member.

2. The guide rail unit of claim 1, wherein the spider is removably mounted on the shaft.

3. The guide rail unit of claim 1, wherein the spider comprises a spring detent grub screw operable to set the spider in position.

4. The guide rail unit of claim 1, wherein the spider comprises at least three mutually orthogonal legs of different lengths.

5. The guide rail unit of claim 1, wherein each of the legs terminates at an end of corresponding shape that includes a widened portion, and wherein the spider is rotatable about the shaft to present an end of a leg to a correspondingly-shaped recess provided in the adjustable guide member thereby to set the guide member in the plurality of positions.

6. The guide rail unit of claim 5, wherein the recess has a narrowed neck for receiving the leg of the spider and an enlarged head for receiving the end of the leg, wherein the neck is narrower than the widened portion of the end thereby stopping movement of the guide member and setting the width of the channel.

7. The guide rail unit of claim 5, wherein the end of each leg comprises a foot that is L-shaped, T-shaped, Y-shaped or jigsaw shaped.

8. The guide rail unit of claim 5, wherein the spider is movable along the shaft thereby allowing the leg to be moved clear of the recess.

9. The guide rail unit of claim 1, further comprising a second spider like the first spider and wherein the guide member has a second recess for receiving a leg of the second spider.

10. The guide rail unit of claim 1, further comprising a second guide member disposed above the first guide member.

11. The guide rail unit of claim 10, wherein the second guide member is mounted on at least one support attached to the first guide member disposed therebelow.

12. The guide rail unit of claim 11, wherein the second guide member is adapted to be mounted on the at least one support in a plurality of discrete positions.

13. The guide rail unit of claim 12, wherein the support extends upwardly and the second guide member has an associated height setting means that co-operates with an upper portion of the at least one support thereby mounting the second guide member on the at least one support at the plurality of discrete positions.

14. The guide rail unit of claim 13, wherein the height setting means are provided on an upper surface of the second guide member.

15. The guide rail unit of claim 14, wherein the height setting means may be operated with one hand.

16. The guide rail unit of claim 12, wherein the at least one support comprises a plurality of narrowed portions and the second guide member contains a movable part to be received within the narrowed portions thereby defining a plurality of mounting positions of the second guide member at different heights.

17. The guide rail unit of claim 16, wherein the height setting means comprises a collar sized and shaped to receive the support.

18. The guide rail unit of claim 17, wherein the collar is provided with a button that, when actuated, causes the moving part to move into and out of the narrowed portion.

19. A conveyor guide including the conveyor guide rail unit of claim 1.

20. A method of adjusting a conveyor guide comprising a guide rail unit including a guide member arranged to define one side of a channel through which an article may be conveyed, the guide rail unit comprising a rotatable spider mounted on a shaft, the spider having a plurality of legs of different lengths relative to the shaft, and the guide member having a slot sized and positioned to receive a leg of the spider, the method comprising changing the position of the guide member from a first position to a second position of a plurality of discrete positions relative to the guide rail unit as a whole, thereby adjusting the width of the channel, by disengaging the leg of the spider from the slot of the guide member, rotating the spider, and engaging a different leg of the spider in the recess of the guide member.

21. The method of claim 20, comprising:
(i) moving the guide member to disengage the spider's leg from the slot;
(ii) rotating the spider to present a different leg to the slot; and
(iii) moving the guide member back into position such that the different leg is received within the slot.

22. The method of claim 20, comprising:
(i) moving the guide member relative to the spider to disengage the spider's leg from the slot;
(ii) rotating the spider to present a different leg to the slot; and
(iii) moving the guide member relative to the spider such that the different leg is received back in position within the slot.

* * * * *